(12) United States Patent
Hwang et al.

(10) Patent No.: US 11,518,286 B2
(45) Date of Patent: Dec. 6, 2022

(54) MOBILE TABLE ASSEMBLY OF VEHICLE

(71) Applicants: HYUNDAI MOTOR COMPANY, Seoul (KR); KIA MOTORS CORPORATION, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 250 days.

(21) Appl. No.: 16/994,886

(22) Filed: Aug. 17, 2020

(65) Prior Publication Data

US 2021/0300225 A1    Sep. 30, 2021

(30) Foreign Application Priority Data

Mar. 30, 2020    (KR) .................. 10-2020-0038266

(51) Int. Cl.
*B60N 3/00* (2006.01)
*B60N 2/01* (2006.01)
*B60N 2/02* (2006.01)
*B60N 2/04* (2006.01)

(52) U.S. Cl.
CPC .............. *B60N 3/001* (2013.01); *B60N 2/01* (2013.01); *B60N 2/0244* (2013.01); *B60N 2/04* (2013.01)

(58) Field of Classification Search
CPC .......... B60N 3/001; B60N 3/002; B60N 2/01; A47B 2005/003; A47B 5/006; A47B 5/04
USPC ........................................................ 296/64
See application file for complete search history.

(56) References Cited

U.S. PATENT DOCUMENTS

| 7,445,188 | B2 * | 11/2008 | Lamparter | B60R 5/003 |
| | | | | 312/246 |
| 10,639,971 | B2 * | 5/2020 | Hoggarth | B60N 3/002 |
| 2002/0194792 | A1 * | 12/2002 | Feldpausch | F16M 11/28 |
| | | | | 248/59 |
| 2009/0293774 | A1 * | 12/2009 | Cheung | A47B 5/06 |
| | | | | 74/89.23 |

(Continued)

FOREIGN PATENT DOCUMENTS

| DE | 19843303 A1 * | 5/1999 | ............... A47B 5/00 |
| FR | 2548981 A1 * | 1/1985 | ............. B60N 3/002 |
| FR | 2998839 A1 * | 6/2014 | ............. B60N 3/002 |

(Continued)

OTHER PUBLICATIONS

Martinet Gilles, English Translation of FR2998839, IP.com, Jun. 6, 2014 (Year: 2014).*

(Continued)

*Primary Examiner* — Jason S Morrow
*Assistant Examiner* — Wenwei Zhuo
(74) *Attorney, Agent, or Firm* — Morgan, Lewis & Bockius LLP

(57) ABSTRACT

A mobile table assembly of a vehicle includes: a guide rail disposed in a roof of a vehicle; a supporting bar having an upper end coupled to the guide rail and movable along the guide rail, and a lower end extending in a direction away from the roof and positioned in an interior of the vehicle; a rail actuator configured to move the upper end of the supporting bar on the guide rail; and a table coupled to the lower end of the supporting bar.

14 Claims, 7 Drawing Sheets

(56) References Cited

U.S. PATENT DOCUMENTS

2019/0174912 A1* 6/2019 Dorn .................... A47B 3/10
2019/0248263 A1* 8/2019 Nagatomi .............. B62D 25/06

FOREIGN PATENT DOCUMENTS

| | | |
|---|---|---|
| JP | 2019-142248 A | 8/2019 |
| KR | 20-1998-0039709 U | 9/1998 |
| KR | 10-1096739 B1 | 12/2011 |
| KR | 10-2019-0052498 A | 5/2019 |

OTHER PUBLICATIONS

Korean Office Action dated Mar. 23, 2021 issued in Korean Patent Application No. 10-2020-0038266.

* cited by examiner

MOBILE TABLE ASSEMBLY OF VEHICLE

CROSS REFERENCE TO RELATED APPLICATION

The present application claims the benefit of priority to Korean Patent Application No. 10-2020-0038266, filed on Mar. 30, 2020 in the Korean Intellectual Property Office, the entire contents of which is incorporated herein for all purposes by reference.

TECHNICAL FIELD

The present disclosure relates to a table assembly that is installed in a vehicle and can be used in the interior of the vehicle and, more particularly, to a mobile table assembly that can deploy a table at an appropriate position even if positions of seats are changed because the table assembly can be moved in the interior of the vehicle through a supporting bar that can be moved on a guide rail attached to a roof of the vehicle.

BACKGROUND

A vehicle was simply defined as a form of transportation in the conventional concept. However, as the outer shape, the interior materials, and the parts of vehicles have been continuously developed, the concept of modern vehicles is developing into a life space beyond transportation. As vehicles are recognized as life spaces, the interior of vehicles is changed in various ways such that passengers can feel comfortable.

Meanwhile, the development of autonomous driving technology minimizes intervention by a driver in a vehicle while driving, thereby changing many parts of vehicles. In particular, the seats in an autonomous vehicle, differing with the present concept, can be freely changed in position and direction without facing the front or being fixed at specific positions. Since intervention in vehicles by a driver is minimized, passengers can do various activities in vehicles that are being driven.

Tables developed up to now have been installed around seats, so it is impossible to freely move the tables or adjust the height. Further, since such tables are positioned between seats, the sizes thereof are unavoidably small, so it is actually difficult to use the tables for various uses. Further, since such tables are fixed in addition to seats, it is difficult to apply the tables to a vehicle in which the positions of seats are not fixed such as an autonomous vehicle.

The present disclosure relates to a mobile table that can be moved in the interior of a vehicle for the first time in the world and can establish a concept of a vehicle as a life space.

The information disclosed in the Background section above is to aid in the understanding of the background of the present disclosure, and should not be taken as acknowledgement that this information forms any part of prior art.

SUMMARY

In order to solve the problems described above, the present disclosure provides a mobile table assembly of a vehicle that can be freely moved in the interior of the vehicle, can be adjusted in height, and can be kept under the roof when it is not used.

In order to achieve the objects, a mobile table assembly of a vehicle of the present disclosure includes: a guide rail disposed in a roof of a vehicle; a supporting bar having an upper end coupled to the guide rail and movable along the guide rail, and a lower end extending in a direction away from the roof and positioned in an interior of the vehicle; a rail actuator configured to move the upper end of the supporting bar on the guide rail; and a table coupled to the lower end of the supporting bar.

The mobile table assembly may further include a first controller configured to change a position of the table in accordance with positions of seats arranged in the vehicle by controlling the rail actuator such that the table is positioned based on the positions of the seats.

When the positions of the seats are changed, the first controller may control the rail actuator by finding out the changed positions of seats and determining positions and directions of the supporting bar and the table.

The first controller may control the rail actuator such that the table is positioned under the guide rail and the supporting bar is positioned at a position where the supporting bar does not overlap the seats.

The supporting bar may include an upper supporting bar connected to the guide rail and extending in said direction by bending perpendicular to the guide rail, and a lower supporting bar connected to a lower end of the upper supporting bar and bending in a same direction as the upper supporting bar to be connected to the table.

The upper supporting bar and the lower supporting bar may be coupled to each other in a fit joint such that a length of the supporting bar may be adjusted in said direction.

The supporting bar may be rotatable with respect to the guide rail and the table may be rotatable with respect to the lower end of the supporting bar, so the supporting bar and the table may be positioned in the interior of the vehicle when the table is used, and the supporting bar and the table may be rotated to be kept under the roof of the vehicle when the table is not used.

The mobile table assembly may further include a rail slider connected with the guide rail and disposed at the upper end of the supporting bar, and wheels disposed on contact surfaces of the rail slider and the guide rail such that the supporting bar slides along the guide rail.

The rail actuator may include a first motor providing power, a first gear connected with the first motor and transmitting power, and a second gear having an end connected to the guide rail and another end being selectively connected with the first gear to slide the supporting bar along the guide rail.

The supporting bar may be connected to be rotatable with respect to the guide rail, and the rail actuator may further include a third gear having an end connected to the supporting bar and another end being selectively connected with the first gear to rotate the supporting bar.

The rail actuator may have a controller controlling operation of the first motor and the controller may be wirelessly controlled.

The mobile table assembly may further include a table guide disposed beneath a bottom of the table, wherein the lower end of the supporting bar may be coupled to the table guide and may slide along the table guide.

The supporting bar may include an upper supporting bar and a lower supporting bar coupled to each other in a fit joint such that a length of the supporting bar can be adjusted in said direction. The mobile table assembly may further include a table actuator disposed under the table, connected to the table and the lower end of the supporting bar to connect the table and the supporting bar to each other, and configured to move the table along the table guide or to adjust the length of the supporting bar.

The table actuator may include a table slider connected to the lower supporting bar and the table guide, coupled to the table guide in a fit joint, such that the table slider slides along the table guide and rotates with respect to the supporting bar.

The table actuator may include a second motor providing power, and a wire connected with the second motor and disposed in the upper supporting bar and the lower supporting bar. The wire may be configured to adjust a fitting length of the upper supporting bar and the lower supporting bar in accordance with a rotational direction of the second motor.

According to the present disclosure, it is possible to use a table in the interior of a vehicle, so it is possible to do various activities in the interior of a vehicle.

Further, it is possible to control the position of the table not to interfere with seats by sensing the arrangement of the seats, so the table can be widely used.

Further, it is possible to freely adjust the position of the table, so it is possible to apply the table to autonomous vehicles by moving the table to appropriate positions even if the arrangement of seats is changed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
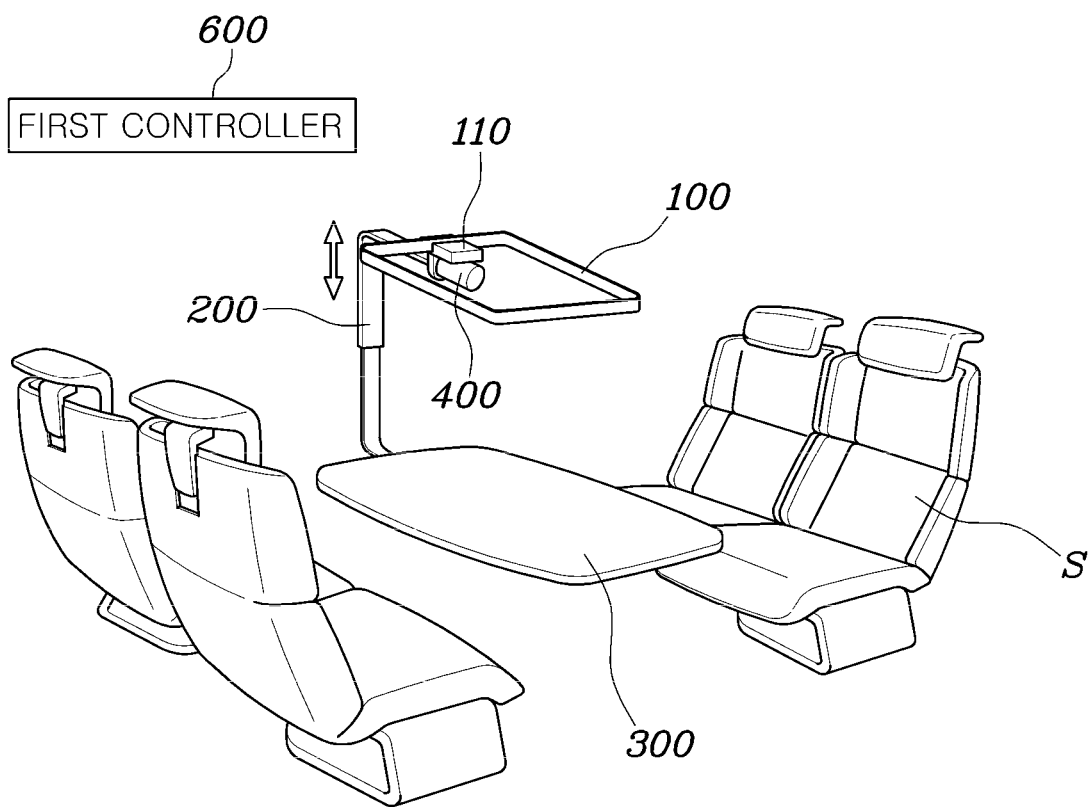
FIGS. 1 and 2 are views showing a use state of a mobile table assembly of a vehicle according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

The present disclosure will be described hereafter in detail by describing exemplary embodiments of the present disclosure with reference to the accompanying drawings. Like reference numerals given in the drawings indicate like components.

The present disclosure relates to a mobile table assembly that is installed in the interior of a vehicle, can be normally folded and kept under the roof (P) of the vehicle, and can be unfolded by a user, if necessary. In particular, since the seat arrangement can be freely changed in futuristic vehicles to which a complete autonomous driving technology is applied, there is a technological characteristic that the position of a table 300 unit can be variably set.

Figure 2:
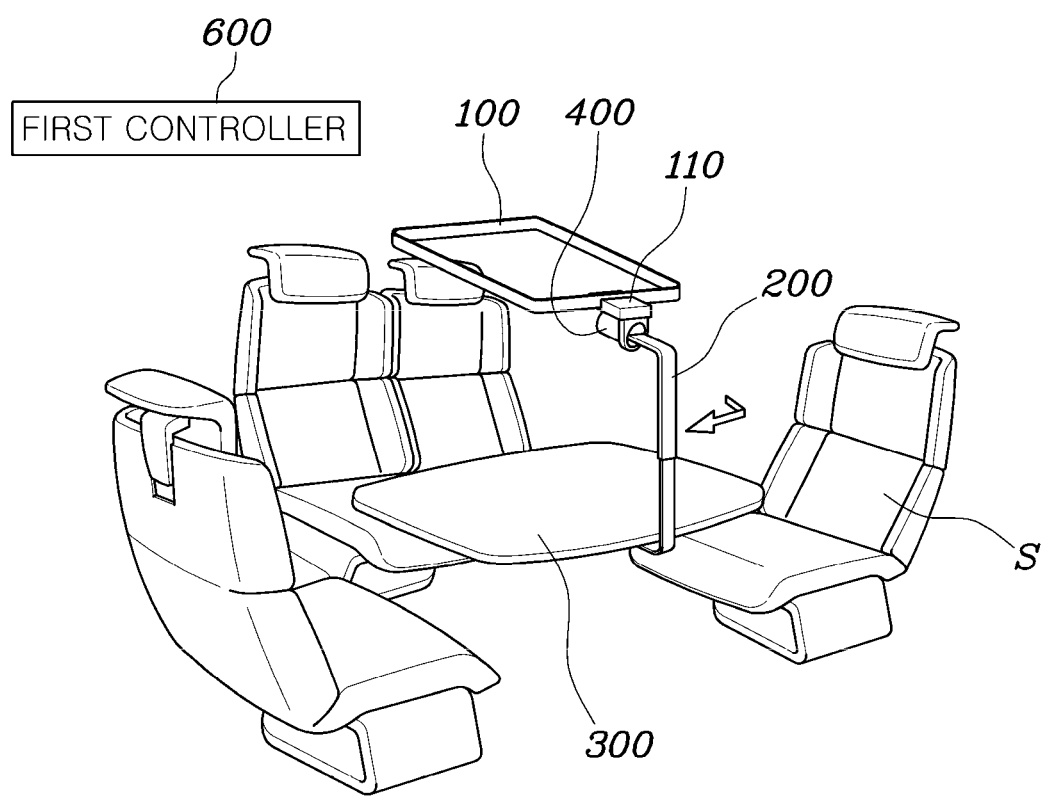

FIGS. 1 and 2 are views showing a use state of a mobile table assembly of a vehicle according to an embodiment of the present disclosure. Referring to FIGS. 1 and 2, a mobile table assembly of a vehicle according to an embodiment of the disclosure may include a guide rail 100, a supporting bar 200, a rail actuator 400, and a table 300.

The guide rail 100 can provide a path through which the mobile table assembly of the vehicle according to an embodiment of the present disclosure can be moved in the interior of the vehicle. The guide rail 100 may be disposed beneath the roof (P) of the vehicle and may be formed in a ring shape. The guide rail may be disposed in the interior material of the roof (P) of the vehicle, and in this case, only a portion of the guide rail is exposed and can appear as a line to the outside. The guide rail 100 may be made of a metal material to have a strength that can support the weight of the table 300 unit.

The supporting bar 200 connects the table 300 and the guide rail 100 to each other and can perform a function that adjusts the unfolded position of the table 300 by moving along the guide rail 100. The upper end of the supporting bar 200 is coupled to the guide rail 100 and can slide along the guide rail 100, whereby it moves by sliding. The lower end of the supporting bar 200 may extend downward and may be positioned in the interior of the vehicle.

Since the supporting bar 200 is slid along the guide rail 100 and the unfolded position of the table 300 is adjusted, so a passenger can adjust the position of the table by sliding the supporting bar 200, if necessary. Since the table 300 is connected to the lower end of the supporting bar 200, the supporting bar 200 may be made of a metal material that can support the weight.

The rail actuator 400 is a device that provides power so that the supporting bar 200 can be moved on the guide rail 100. The rail actuator 400 may be disposed at the upper end of the supporting bar 200 and connected to the guide rail 100. The detailed configuration and function of the rail actuator 400 will be described below.

The table 300 may be formed in a plate shape on which passengers can put and use objects. The table 300 is coupled to the lower end of the supporting bar 200 and may be exposed in the interior of the vehicle.

The mobile table assembly of the vehicle according to an embodiment of the present disclosure may further include a first controller 600. The first controller 600 can find out the position information of seats (S) disposed in the vehicle and can control the rail actuator 400 to move the table 300 on the basis of the position information. The first controller 600 may be disposed in electronic parts of the vehicle.

In vehicles to which the autonomous driving technology is applied, the arrangement of seats (S) can be freely changed. Referring to FIGS. 1 and 2, the positions of seats (S) can be variably set, depending on selection of passengers, and the position where the table 300 is exposed in the interior also need to be changed in accordance with the positions of the seats (S). The first controller 600 can control the rail actuator 400 to move the table 300 to positions where passengers can easily use the table 300 in the interior, depending on the positions of the seats (S).

When the positions of the seats (S) are changed from their set positions, the first controller 600 can find out the changed positions of the seats (S), and can determine the positions and directions of the supporting bar 200 and the table 300 and control the rail actuator 400 such that the table 300 is exposed at an appropriate position. The first controller 600 can be electrically connected with the rail actuator 400.

For example, when the positions of the seats (S) are changed, as shown in FIG. 2, with the supporting bar 200 and the table 300 at the positions shown in FIG. 1, the first controller can move the supporting bar 200 and the table 300 to the positions shown in FIG. 2 by controlling the rail actuator 400. That is, the first controller 600 controls the rail actuator 400 such that the table 300 is positioned under the guide rail 100 and the supporting bar 200 is positioned at a position where it does not overlap the seats (S). Accordingly, there is an advantage that even though the positions and directions of seats (S) are changed in the vehicle to which the autonomous driving technology is applied, the table 300 can be adjusted to appropriate positions by the first controller 600.

Referring to FIGS. 1 and 2, the supporting bar 200 may be composed of an upper supporting bar 210 and a lower supporting bar 220. An end of the upper supporting bar 210 may be connected to the guide rail 100 and may extend in parallel with and bend perpendicular to the guide rail 100, whereby the upper supporting bar 210 has a vertically extending shape. The lower supporting bar 220 may be connected to the lower end of the upper supporting bar, may bend in the same direction as the upper supporting bar, and may be connected to the table 300. The upper supporting bar 210 and the lower supporting bar 220 may be formed in a U-shape.

When having this shape, the supporting bar 200 may be disposed toward a portion where the seats (S) are not positioned, and the bending portions of the upper supporting bar 210 and the lower supporting bar 220 may be disposed toward the interior of the vehicle. Accordingly, the supporting bar 200 is disposed at a position where it does not interfere with the seats (S) and passengers can easily use the table, so there is an advantage that it is possible to efficiently use a space. Further, the supporting bar 200 can firmly support the table 300, so there is an effect that stability can be improved.

The upper supporting bar 210 and the lower supporting bar 220 of the supporting bar 200 are coupled to each other in a fit joint. Since the upper supporting bar 210 and the lower supporting bar 220 are coupled to each other in the fit joint, the upper and lower supporting bars 210 and 220 can be slidable to each other at the fit joint and the length of the supporting bar 200 can be vertically adjusted. The vertical position of the table 300 depends on the body structures of passengers or the use of the table 300, but the table 300 can be adjusted to appropriate positions, so passengers can conveniently use the table 300. Further, since the heights of vehicles are different, depending on the kinds of the vehicles, there is an advantage that it is possible to apply the table assembly to various vehicles by using the height adjustment function of the supporting bar 200.

Figure 3:
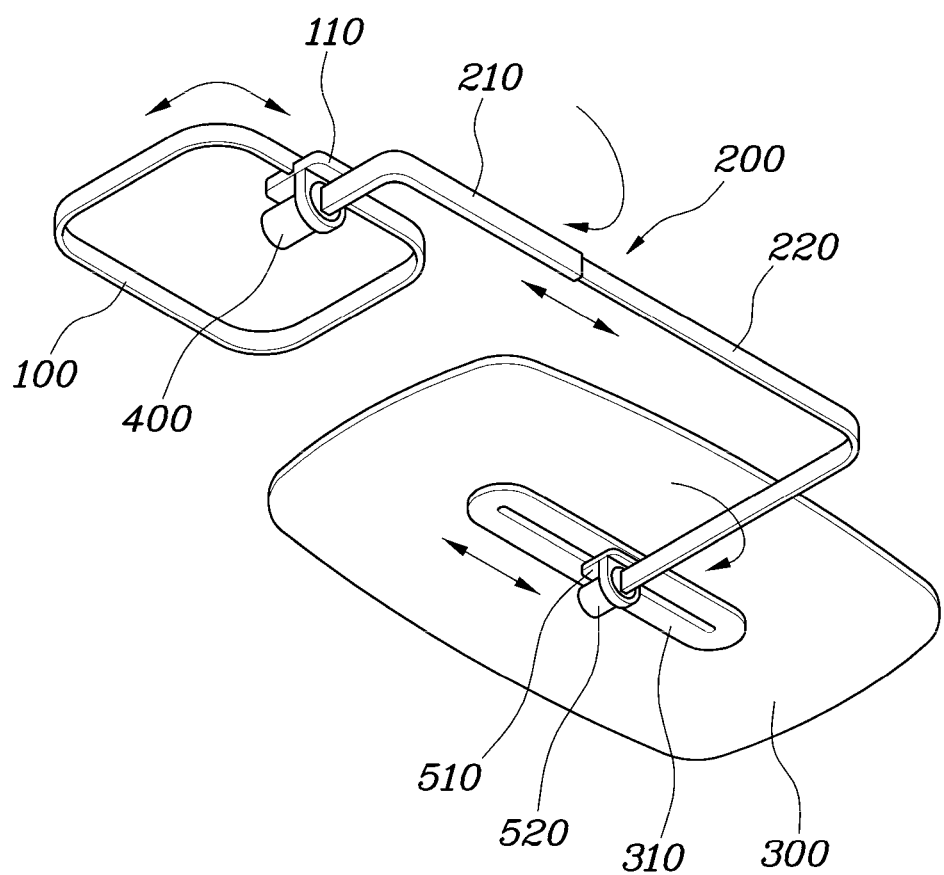
FIG. 3 is a view showing movement of the mobile table assembly of a vehicle according to an embodiment of the present disclosure.

FIG. 3 is a view showing movement of the mobile table assembly of a vehicle according to an embodiment of the present disclosure.

Referring to FIG. 3, the supporting bar 200 can be coupled to be rotatable with respect to the guide rail 100. The supporting bar 200 can slide along the guide rail 100 and can be rotated to be positioned in parallel with or perpendicular to the roof having the guide rail 100 therein.

The table 300 may be coupled to be rotatable with respect to the lower end of the supporting bar 200. That is, the table 300 can also be rotated to be positioned parallel or perpendicular to the roof.

Figure 4:
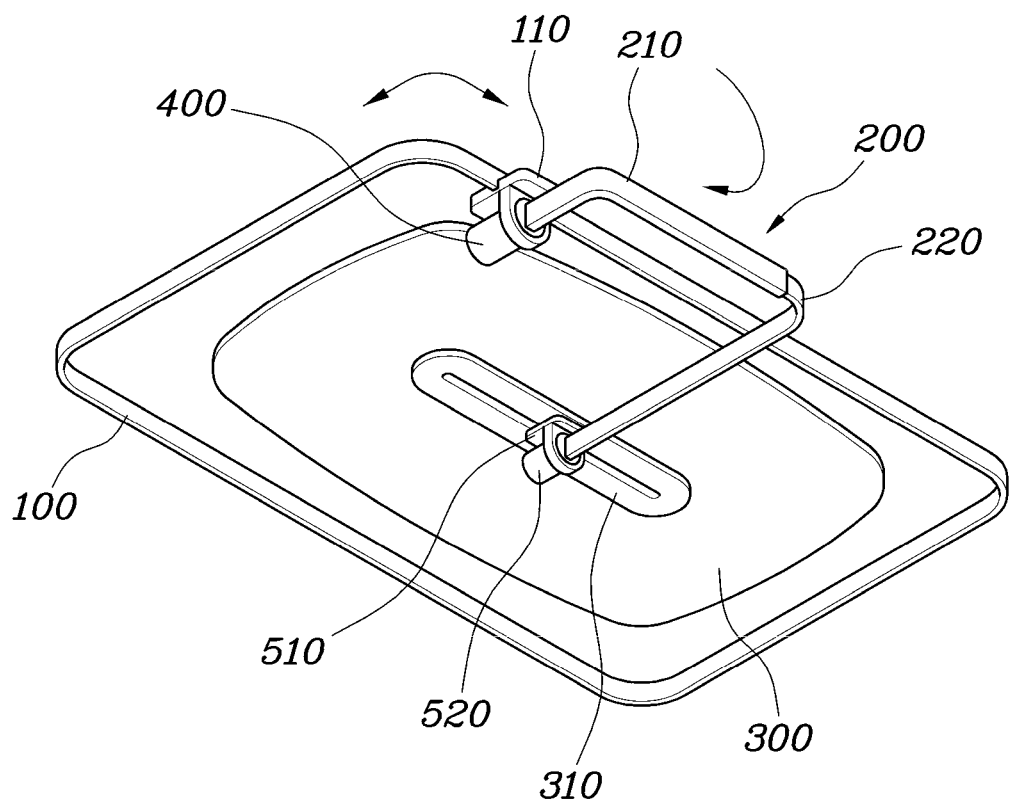
FIG. 4 is a view showing a state when the mobile table assembly of a vehicle according to an embodiment of the present disclosure is kept under a roof of a vehicle.

FIG. 4 is a view showing a state when the mobile table assembly of a vehicle according to an embodiment of the present disclosure is kept under a roof of the vehicle.

The supporting bar 200 is contracted by fitting the upper supporting bar 210 and the lower supporting bar 220, which are formed in a fitting structure, to each other and then the supporting bar 200 is rotated such that the table 300 is positioned parallel with the roof, whereby the table assembly can be kept under the roof, as shown in FIG. 4. When passengers do not use the table assembly of the present disclosure, the table assembly can be easily kept under the roof, so there is an effect that it is possible to efficiently use a space.

Figure 5:
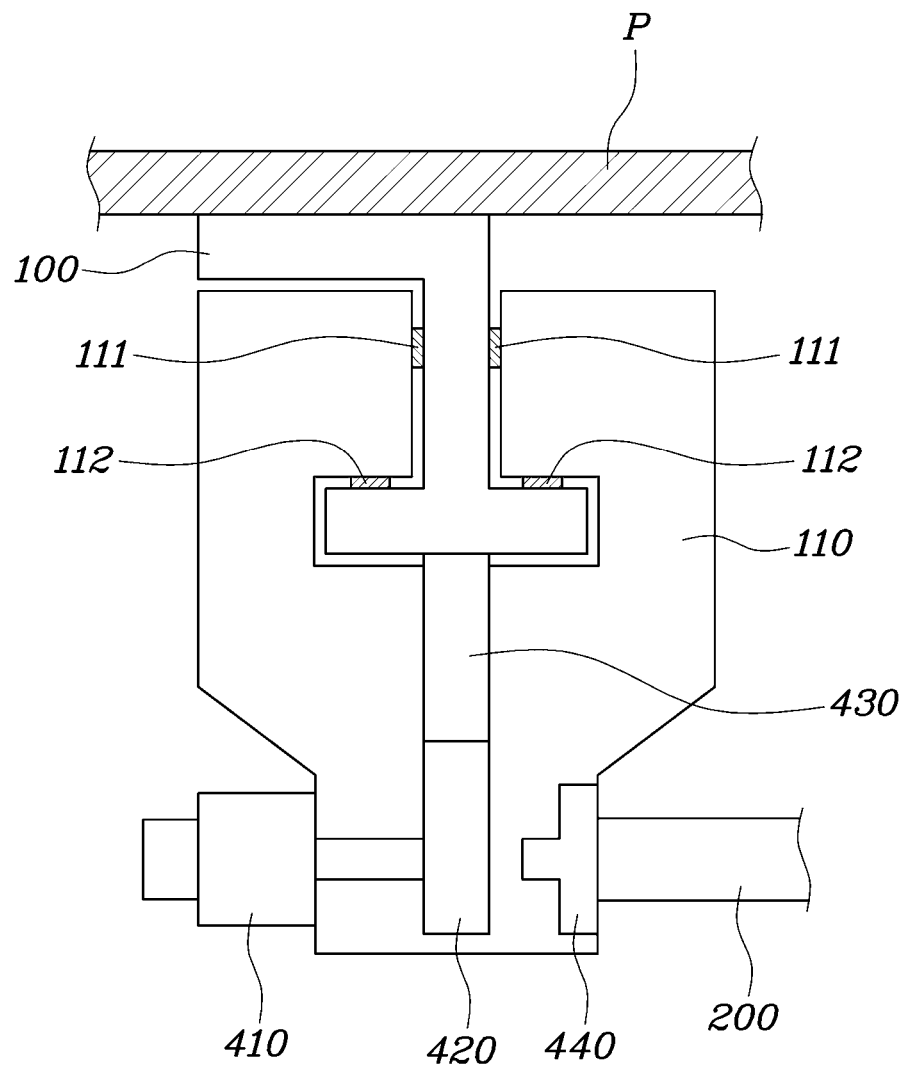
FIG. 5 is a view showing the structure of a rail actuator of the mobile table assembly of a vehicle according to an embodiment of the present disclosure.
Figure 6:
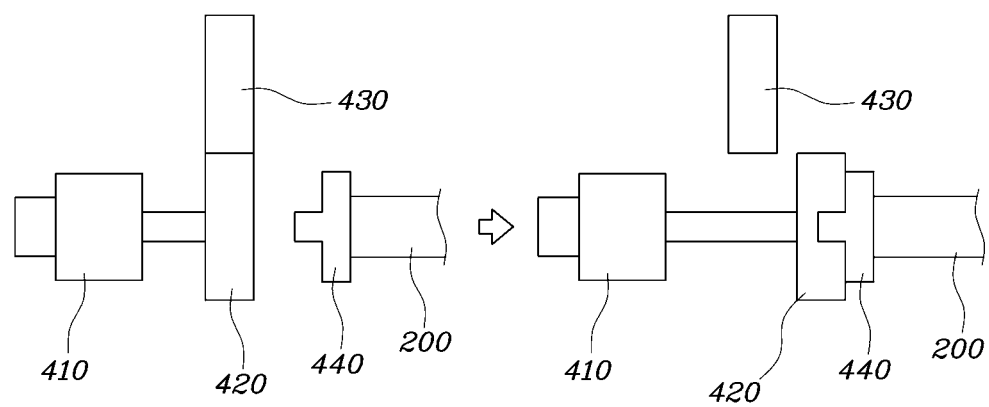
FIG. 6 is a view showing the operation of the rail actuator of the mobile table assembly of a vehicle according to an embodiment of the present disclosure.

FIG. 5 is a view showing the structure of the rail actuator 400 of the mobile table assembly of a vehicle according to an embodiment of the present disclosure and FIG. 6 is a view showing the operation of the rail actuator 400 of the mobile table assembly of a vehicle according to an embodiment of the present disclosure.

Referring to FIG. 5, the mobile table assembly of a vehicle according to an embodiment of the disclosure may further include a rail slider 110 connected to the guide rail 100 at the upper end of the supporting bar 200. The rail slider 110 is a part that assists the supporting bar 200 to move along the guide rail 100. Wheels 111 and 112 enabling the supporting bar 200 to slide along the guide rail 100 may be disposed on the contact surfaces of the rail slider 110 and the guide rail 100.

As shown in FIG. 5, pluralities of wheels 111 and 112 may be provided, depending on the contact surfaces. It is possible to prevent the contact surfaces of the rail slider 110 and the guide rail 100 to be worn due to rotation in movement directions of the supporting bar 200. Since the wheels 111 and 112 are provided, the supporting bar 200 and the guide rail 100 can be spaced a predetermined distance apart from each other, so it is possible to prevent wear due to use and maintain the strength.

The rail actuator 400 may be composed of a first motor 410, a first gear 420, a second gear 430, and a third gear 440. The first motor 410 is a device providing power. The first motor 410 is connected with the first gear 420, so it can provide power to the first gear 420. The first motor 410 may be disposed at a side of the rail slider 110 and a shaft of the rail slider 110 may be inserted in the rail slider 110 and connected with the first gear 420. The first gear 420 may be disposed at the center in the rail slider 110 and the second gear 430 may be disposed over the first gear 420.

The second gear 430 is a part that provides power to slide the rail slider 110 along the guide rail 100. An end of the second gear 430 may be connected to the rail slider 110 and another end is connected with the first gear 420, so when the first gear 420 is rotated, the second gear 430 is also rotated, thereby being able to move the rail slider 110.

The third gear 440 can enable the supporting bar 200 to be rotated and kept under the roof or positioned in the interior of the vehicle. The third gear 440 may be disposed opposite to the first motor 410 in the rail slider 110. An end of the third gear 440 may be connected to the supporting bar 200 and another end may be selectively connected with the first gear 420. When the first gear 420 and the third gear 440 are connected and the first motor 410 is operated, the first gear 420 is also operated and power is transmitted to the third gear 440. When the third gear 440 is rotated, the supporting bar 200 is rotated with respect to the guide rail 100 and can be kept under the roof, as described above.

Referring to FIG. 6, the first gear 420 can be selectively connected with the second gear 430 or the third gear 440. The first gear 420 and the second gear 430 may be connected to move the rail slier 110, and the first gear 420 and the third gear 440 may be connected to rotate the supporting bar 200.

The rail actuator 400 may include a second controller that controls operation of the first motor 410. The second controller can operate the first motor 410 or can connect the first gear 420 to the second gear 430 or the third gear 440. The second controller is electrically connected with the first controller 600 described above, so it can adjust the position of the table 300 or the height of the supporting bar 200. Further, the second controller can be manually operated by a passenger or may include a communication device to be operated through wireless communication.

Figure 7:
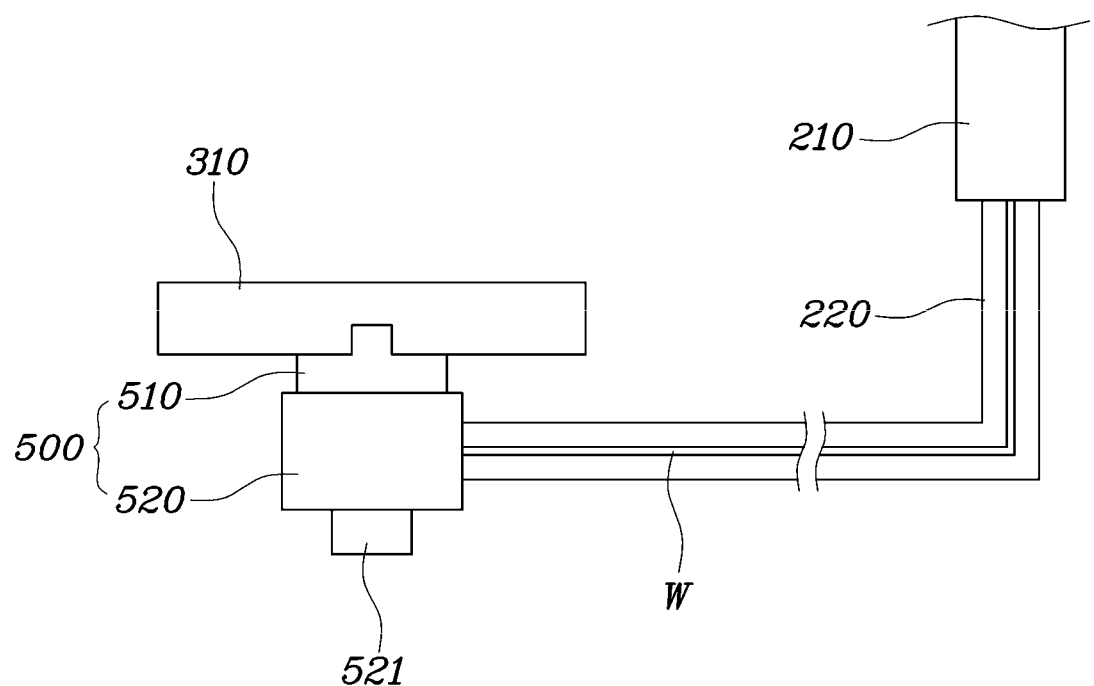
FIG. 7 is a cross-sectional view of a table actuator and a supporting bar of the mobile table assembly of a vehicle according to an embodiment of the present disclosure.

FIG. 7 is a cross-sectional view of a table actuator 500 and the supporting bar 200 of the mobile table assembly of a vehicle according to an embodiment of the present disclosure.

Referring to FIGS. 3 and 7, a table guide 310 may be disposed beneath the bottom of the table 300. The lower end of the supporting bar 200 is coupled to the table guide 310 and can slide along the table guide 310. Accordingly, a passenger can adjust the position of the table 300 in accordance with the use purpose. Since the table 300 is coupled to be rotatable with respect to the supporting bar 200, there is an advantage of convenient use.

Referring to FIG. 7, the mobile table assembly of a vehicle according to an embodiment of the present disclosure may further include a table actuator 500. The table actuator 500 may include a table slider 510, a second motor 520, and a wire (W).

The table slider 510 can connect the lower end of the supporting bar 200 and the table 300. The table slider 510 is fitted and slid in the table guide 310, thereby being able to move the table 300 with respect to the supporting bar 200. The table slider 510 is rotatably fitted in the table guide 310, so it can rotate the table 300 with respect to the supporting bar 200.

The second motor 520 is a device providing power. The second motor 520 may be connected with the wire (W). The second motor 520 can pull and wind the wire (W) by rotating it.

The wire (W) is disposed in the upper supporting bar 210 and the lower supporting bar 220, so it can adjust the fitting length of the upper supporting bar 210 and the lower supporting bar 220. For example, when the second motor 520 is rotated forward, the wire (W) is pulled or wound and fits the lower supporting bar 220 into the upper supporting bar 210, whereby the table 300 can be lifted to a high position.

On the contrary, when the second motor 520 is rotated backward, the wire (W) is unwound and pulls the lower supporting bar 220 out of the upper supporting bar 210, whereby the table 300 can be moved down to a low position. That is, the fitting length of the upper supporting bar 210 and the lower supporting bar 220 can be adjusted and the height of the table 300 can be adjusted in accordance with the rotational direction of the second motor 520. Accordingly, a passenger can move and use the table 300 at desired positions.

As described above, since the mobile table assembly of a vehicle according to an embodiment of the present disclosure can be positioned and moved in the interior of the vehicle and the height thereof can be adjusted, there is an advantage that it is possible to apply and use the table assembly regardless of the kinds of vehicles and the physical conditions of passengers. A third controller 521 may also be provided for the second motor 520. The third controller 521 may adjust the height of the table 300 by operating the second motor 520.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A mobile table assembly of a vehicle, comprising:
   a guide rail disposed in a roof of the vehicle;
   a supporting bar having an upper end coupled to the guide rail and movable along the guide rail, and a lower end extending in a direction away from the roof and positioned in an interior of the vehicle;
   a rail actuator configured to move the upper end of the supporting bar on the guide rail;
   a table coupled to the lower end of the supporting bar; and
   a first controller configured to change a position of the table in accordance with positions of seats arranged in the vehicle by controlling the rail actuator such that the table is positioned based on the positions of the seats.

2. The mobile table assembly of claim 1, wherein when the positions of the seats are changed, the first controller controls the rail actuator by finding out the changed positions of the seats and determining positions and directions of the supporting bar and the table.

3. The mobile table assembly of claim 1, wherein the first controller controls the rail actuator such that the table is positioned under the guide rail and the supporting bar is positioned at a position where the supporting bar does not overlap the seats.

4. A mobile table assembly of a vehicle, comprising:
   a guide rail disposed in a roof of the vehicle;
   a supporting bar having an upper end coupled to the guide rail and movable along the guide rail, and a lower end extending in a direction away from the roof and positioned in an interior of the vehicle;
   a rail actuator configured to move the upper end of the supporting bar on the guide rail; and
   a table coupled to the lower end of the supporting bar,
   wherein the supporting bar includes an upper supporting bar connected to the guide rail and extending in said direction by bending perpendicular to the guide rail, and a lower supporting bar connected to a lower end of the upper supporting bar and bending in a same direction as the upper supporting bar to be connected to the table.

5. The mobile table assembly of claim 4, wherein the upper supporting bar and the lower supporting bar are coupled to each other in a fit joint such that a length of the support bar is adjusted in said direction.

6. The mobile table assembly of claim 1, wherein the supporting bar is rotatable with respect to the guide rail and the table is rotatable with respect to the lower end of the supporting bar, so the supporting bar and the table are positioned in the interior of the vehicle when the table is used, and the supporting bar and the table are rotated to be kept under the roof of the vehicle when the table is not used.

7. The mobile table assembly of claim 1, further comprising a rail slider connected with the guide rail and disposed at the upper end of the supporting bar, and wheels disposed on contact surfaces of the rail slider and the guide rail such that the supporting bar slides along the guide rail.

8. A mobile table assembly of a vehicle, comprising:
a guide rail disposed in a roof of the vehicle;
a supporting bar having an upper end coupled to the guide rail and movable along the guide rail, and a lower end extending in a direction away from the roof and positioned in an interior of the vehicle;
a rail actuator configured to move the upper end of the supporting bar on the guide rail; and
a table coupled to the lower end of the supporting bar,
wherein the rail actuator includes a first motor providing power, a first gear connected with the first motor and transmitting power, and a second gear having an end connected to the guide rail and another end being selectively connected with the first gear to slide the supporting bar along the guide rail.

9. The mobile table assembly of claim 8, wherein the supporting bar is rotatable with respect to the guide rail, and the rail actuator further includes a third gear having an end connected to the supporting bar and another end being selectively connected with the first gear to rotate the supporting bar.

10. The mobile table assembly of claim 9, wherein the rail actuator has a second controller controlling operation of the first motor and the second controller is wirelessly controlled.

11. The mobile table assembly of claim 1, further comprising a table guide disposed beneath a bottom of the table, wherein the lower end of the supporting bar is coupled to the table guide and slides along the table guide.

12. The mobile table assembly of claim 11, wherein the supporting bar includes an upper supporting bar and a lower supporting bar coupled to each other in a fit joint such that a length of the supporting bar is adjusted in said direction, and
the mobile table assembly further comprises a table actuator disposed under the table connected to the table and the lower end of the supporting bar to connect the table and the supporting bar to each other, and configured to move the table along the table guide or to adjust the length of the supporting bar.

13. The mobile table assembly of claim 12, wherein the table actuator includes a table slider connected to the lower supporting bar and the table guide, the table slider being coupled to the table guide in a fit joint such that the table slider slides along the table guide and rotates with respect to the supporting bar.

14. The mobile table assembly of claim 12, wherein the table actuator includes a second motor providing power, and a wire connected with the second motor and disposed in the upper supporting bar and the lower supporting bar, the wire being configured to adjust a fitting length of the upper supporting bar and the lower supporting bar in accordance with a rotational direction of the second motor.

* * * * *